United States Patent
Gattiglio et al.

(10) Patent No.: US 11,133,638 B2
(45) Date of Patent: Sep. 28, 2021

(54) APPARATUS FOR COMBINING LASER BEAMS IN OPTICAL FIBERS, AND CORRESPONDING METHOD

(71) Applicant: Prima Electro S.p.A., Moncalieri (IT)

(72) Inventors: Maurizio Gattiglio, Moncalieri (IT); Luca Di Stefano, Moncalieri (IT); Andrea Agliati, Moncalieri (IT)

(73) Assignee: Prima Electro S.p.A., Moncalieri (IT)

( * ) Notice: Subject to any disclaimer, the term of this patent is extended or adjusted under 35 U.S.C. 154(b) by 0 days.

(21) Appl. No.: 16/730,119

(22) Filed: Dec. 30, 2019

(65) Prior Publication Data
US 2020/0212644 A1 Jul. 2, 2020

(30) Foreign Application Priority Data
Dec. 31, 2018 (IT) .................... 102018000021538

(51) Int. Cl.
*G02B 6/42* (2006.01)
*H01S 3/067* (2006.01)

(52) U.S. Cl.
CPC ........ *H01S 3/06733* (2013.01); *G02B 6/4296* (2013.01)

(58) Field of Classification Search
CPC .......... G02B 6/42; G02B 6/26; G02B 6/4296; H01S 3/06733
See application file for complete search history.

(56) References Cited

U.S. PATENT DOCUMENTS

| | | | |
|---|---|---|---|
| 8,320,426 B2 * | 11/2012 | Grapov ................ | G02B 6/4214 372/107 |
| 2018/0106970 A1 * | 4/2018 | Takigawa ............... | G02B 26/08 |
| 2019/0030641 A1 * | 1/2019 | Nagayasu ............... | G02B 6/425 |

* cited by examiner

*Primary Examiner* — Jennifer Doan
(74) *Attorney, Agent, or Firm* — Nixon & Vanderhye P.C.

(57) ABSTRACT

An apparatus comprises a multi-clad fiber that includes a light-guiding core surrounded by at least a cladding layer, and an input interface including a first set of input channels in the core configured to receive a first optical fiber, and a second set of input channels in the cladding layer configured to receive a second optical fiber. The apparatus further includes an optical switch module having an input port, a first and a second output port, a first optical path between the input port and the first input channel, and a second optical path between the input port and a second input channel in the second set of input channels. The optical switch module is controllable to switch between the first and the second optical paths. The apparatus also includes a set of laser modules.

14 Claims, 3 Drawing Sheets

APPARATUS FOR COMBINING LASER BEAMS IN OPTICAL FIBERS, AND CORRESPONDING METHOD

This application claims priority to Italian Patent Application No. 102018000021538 filed on Dec. 31, 2018, the entire contents of which are hereby incorporated by reference.

TECHNICAL FIELD

The present disclosure relates to the combination of guided laser radiation in multi-clad optical fibers in order to vary the optical characteristics (for example, the transverse modes and/or the numeric aperture) of a laser beam propagated through the fiber itself for generation of different distributions of energy in the focus of a lens.

One or more embodiments may be applied in the field of high-power lasers.

TECHNOLOGICAL BACKGROUND

In the treatment of materials via application of laser beams, which comprises different processes and applications, it may prove useful to be able to employ laser beams with characteristics that can be adapted to the context of application and to the specific process.

Known techniques for adapting the above parameters of the propagation profile of the laser may include the use of multi-clad optical fibers, which comprise at least a core and at least an inner cladding and an outer cladding, which are designed to guide (that is, propagate) the light transmitted in them.

In general, methods are known for generating a laser beam with different characteristics of the wave-front profile, where a laser beam is injected into one end of a multi-cladding active fiber, in particular a double-clad fiber, and emitted at the other end of the multi-clad fiber and wherein, to generate different characteristics of the profile of the output laser beam, the input laser beam is injected into the core of the multi-clad fiber or into a cladding of the multi-clad fiber. This method is usually used on the output fibers of the laser generator and hence on fibers that guide the total power of the laser itself, with corresponding limitations of use for high-power lasers.

Such a solution can be obtained using optical components that direct the laser beam into the core or into the cladding layer. In particular, this solution was initially used with lasers that combine beams in space, for example disk lasers, where adoption of the above optical devices is simpler. For optical-fiber lasers in which free-space propagation elements are not present but wherein propagation of the beam occurs totally inside an optical fiber, the use of the above devices requires interruption of propagation in the fiber in order to insert the free-space coupling device, with consequent poor efficiency and greater complexity.

To avoid this consistent limitation, fiber lasers manufacturers have proposed some solutions. For this purpose, there have been employed methods of bending of the output fiber to be able to direct the beam from the core to the cladding, or else actuators capable of changing the refractive index of the fiber in order to move the beam from the core to the cladding, and vice versa. These methods have, however, proven complex and costly. A further simpler and obvious method is described, for example, in document No. WO2018/104575 A1, and it is relative to a laser-processing apparatus and use thereof, the apparatus comprising a first laser device, with a first feed fiber and a second laser device with a second feed fiber. Beam-combining means connected to the first and second feed fibers and to a multi-clad optical fiber are designed to form a composite laser beam by aligning the first optical feed fiber with the core of the multi-clad optical fiber and the second optical feed fiber with at least one cladding of the multi-clad optical fiber. Propagation through the core and/or the cladding enable emission of a composite laser beam. A control unit controls the power density of at least one of the first and second laser beams of the composite beam in given circumstances to adjust the power density.

This solution, which makes it possible, among other things, to obtain a beam parameter product (BPP), namely, the product between the half-angle of divergence and the minimum radius (or waist) of the laser beam, that is lower in the core and higher in the cladding, makes it possible to provide a full-glass device, that is one where propagation takes place entirely in the fiber, but presents certain disadvantages, amongst which the fact that the total power cannot be used in both circumstances, but only part of the power available can be used in the core or in the cladding.

Notwithstanding the vast research activity in this area, as witnessed, for example, by various documents, as mentioned in the foregoing, improved solutions are hence desirable.

OBJECT AND SUMMARY

An object of one or more embodiments is to contribute to providing such an improved solution.

According to one or more embodiments, the above object may be achieved by an apparatus having the characteristics set forth in the claims that follow.

An apparatus comprising selectable optical paths for coupling a set of optical fibers to an interface of a multi-clad fiber may be an example of such an apparatus.

One or more embodiments may relate to a corresponding method.

A method for generation of a laser beam with selection of the wave-front profile may provide an example of such a method.

Embodiments of the present disclosure present the advantage of making it easier to obtain improved functions, for example a power that can be scaled between two or more cores of a multi-clad fiber.

One or more embodiments enabling easier distribution of the power of one or more laser beams in a first core of a multi-clad fiber.

One or more embodiments make it easier to obtain a laser profile of a quasi-Gaussian type, an annular type, or a mixture of the two, for example enabling passage from one profile to the other in a gradual and flexible way.

The claims form an integral part of the technical teaching provided herein with reference to the embodiments.

BRIEF DESCRIPTION OF THE DRAWINGS

One or more embodiments will now be described, purely by way of example, with reference to the annexed drawings, wherein.

DETAILED DESCRIPTION OF EXAMPLES OF EMBODIMENTS

In the ensuing description, one or more specific details are illustrated, in order to enable an in-depth understanding of examples of embodiments of the present disclosure. The embodiments may be provided without one or more of the specific details or with other methods, components, materials, etc. In other cases, known operations, materials, or structures are not illustrated or described in detail in such a way that certain aspects of the embodiments will not be obscured.

Reference to "an embodiment" or "one embodiment" in the framework of the present description is intended to indicate that a particular configuration, structure, or characteristic described with reference to the embodiment is included in at least one embodiment. Likewise, phrases such as "in an embodiment" or "in one embodiment", and the like, that may be present in one or more points of the present description do not necessarily refer to one and the same embodiment.

Moreover, particular conformations, structures, or characteristics may be combined in any adequate way in one or more embodiments.

The references used herein are provided merely for convenience and hence do not define the sphere of protection or the scope of the embodiments.

Figure 1:
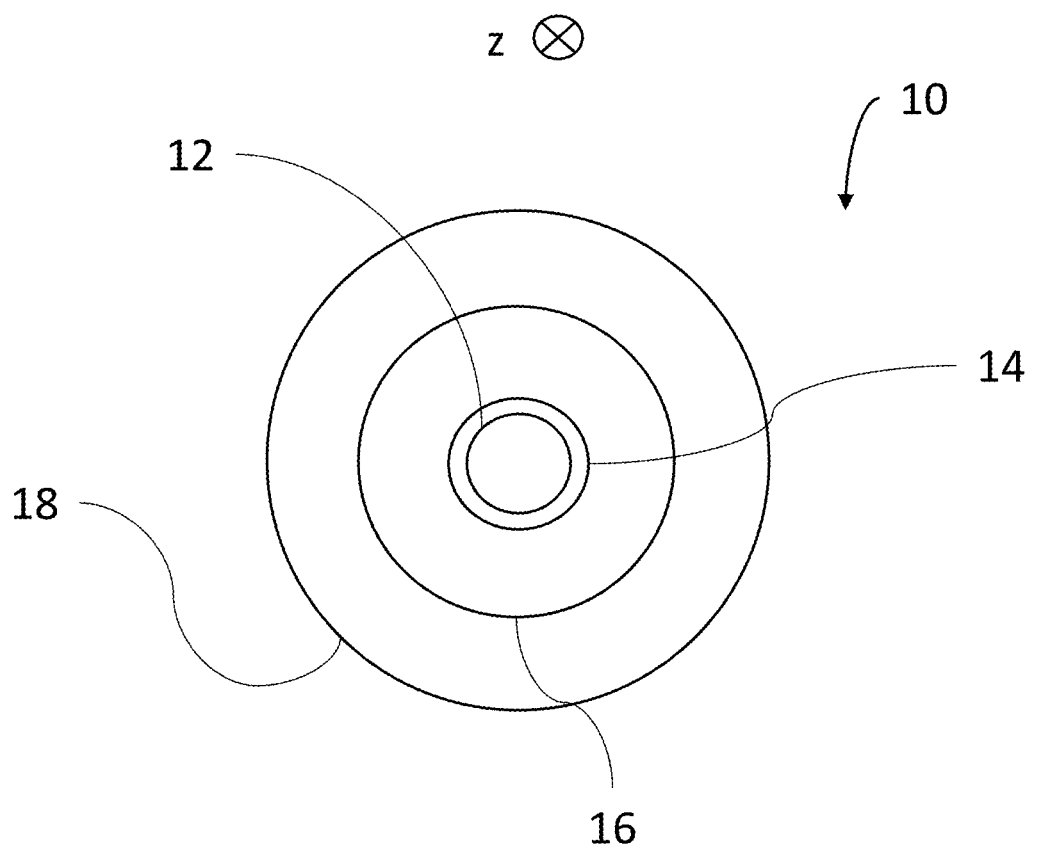
FIG. 1 represents a cross-sectional view of a coupler as per the present disclosure.

FIG. 1 is a cross-sectional view (with respect to a longitudinal direction z in which the element extends) of a multi-clad optical fiber 10, in the example a double-clad fiber, which, unlike a single-clad optical fiber, comprises a multi-layered structure, as discussed in what follows.

The double-clad optical fiber 10, as shown by way of example in FIG. 1, comprises:
- a core 12, which comprises a material that has a first refractive index $n_1$;
- a first cladding layer 14, which has the function of confining the light in the core 12, comprises a material with a second refractive index $n_2$, lower than the first refractive index $n_1$, and surrounds the first core 12;
- a second cladding layer 16, which has the function of guiding light, i.e., of transmitting electromagnetic radiation, and comprises material with a third refractive index $n_3$; this third refractive index $n_3$ is higher than the second refractive index $n_2$ and lower than or equal to the first refractive index $n_1$; and
- a third cladding layer 18, which comprises material with a fourth refractive index $n_4$; such a third cladding layer 18, in the example described herein, is also a guiding layer, with a fourth refractive index $n_4$ lower than the third refractive index $n_3$.

It is pointed out that the ensuing description, albeit referring to a double-clad optical fiber 10, may be extended to a generic multi-clad fiber.

In general, the multi-clad fiber 10 to which the solution as per the present disclosure relates comprises a light-guiding core 12, surrounded by at least one light-guiding cladding layer, that is the cladding layer 16. There may be present also further light-guiding or light-confining layers, with different ratios between the respective refractive indices according to the different structures available of known multi-clad fibers.

In the exemplified embodiments there is also the confining cladding layer 14, wherein such a confining cladding layer 14 surrounding the core 12 has a refractive index $n_2$ lower than a refractive index $n_1$ of the core 12, and the guiding cladding layer 16 has a refractive index $n_3$ higher than the refractive index $n_2$ of the confining cladding layer 14, which is set between the core 12 and the guiding cladding layer 16.

In various embodiments, the first refractive index $n_1$ and the third refractive index $n_3$, of the core 12 and of the second cladding layer 16, respectively, which have functions of guiding laser radiation, are in general higher than the values of the indices $n_2$, $n_4$ of the first cladding layer 14 and of the third cladding layer 18, respectively. In this context, moreover, the first refractive index $n_1$ and the third refractive index $n_3$ are preferably the same as one another. Also, the second refractive index $n_2$ and the fourth refractive index $n_4$ may be the same or different, their value being, in any case, lower than that of the first refractive index $n_1$ and higher than that of the second refractive index $n_2$ to be able to contain the laser radiation.

Multi-clad fibers suitable for the apparatus and method described herein may present a sequence of cladding layers around the core 12 with progressively decreasing respective refractive indices, for example $n_1 > n_2 > n_3 > n_4$.

The double-clad fiber 10, or more in general a multi-clad fiber, may comprise a further protective layer (not visible in the figure) that surrounds the layered structure of the fiber 10, for example a protective sheath made of silicone or some other synthetic material.

In other various embodiments, instead of the third cladding layer 18 there may be the protective layer. In other various embodiments, the third cladding layer 18 is configured, via its refractive index, so as to operate as a confining layer.

One or more light beams can be propagated within the core 12 and/or the second cladding layer 16 in the fiber 10 via total internal reflection (TIR).

It is noted that, albeit represented as having concentric circular sections in the example of FIG. 1, both the core 12 and the second cladding layer 16 may present different shapes. For instance, the first core 12 may have a square or rectangular shape and/or the second core 16 may comprise a cross section having a perimeter formed by a plurality of segments with linear or circular shapes.

Figure 2:
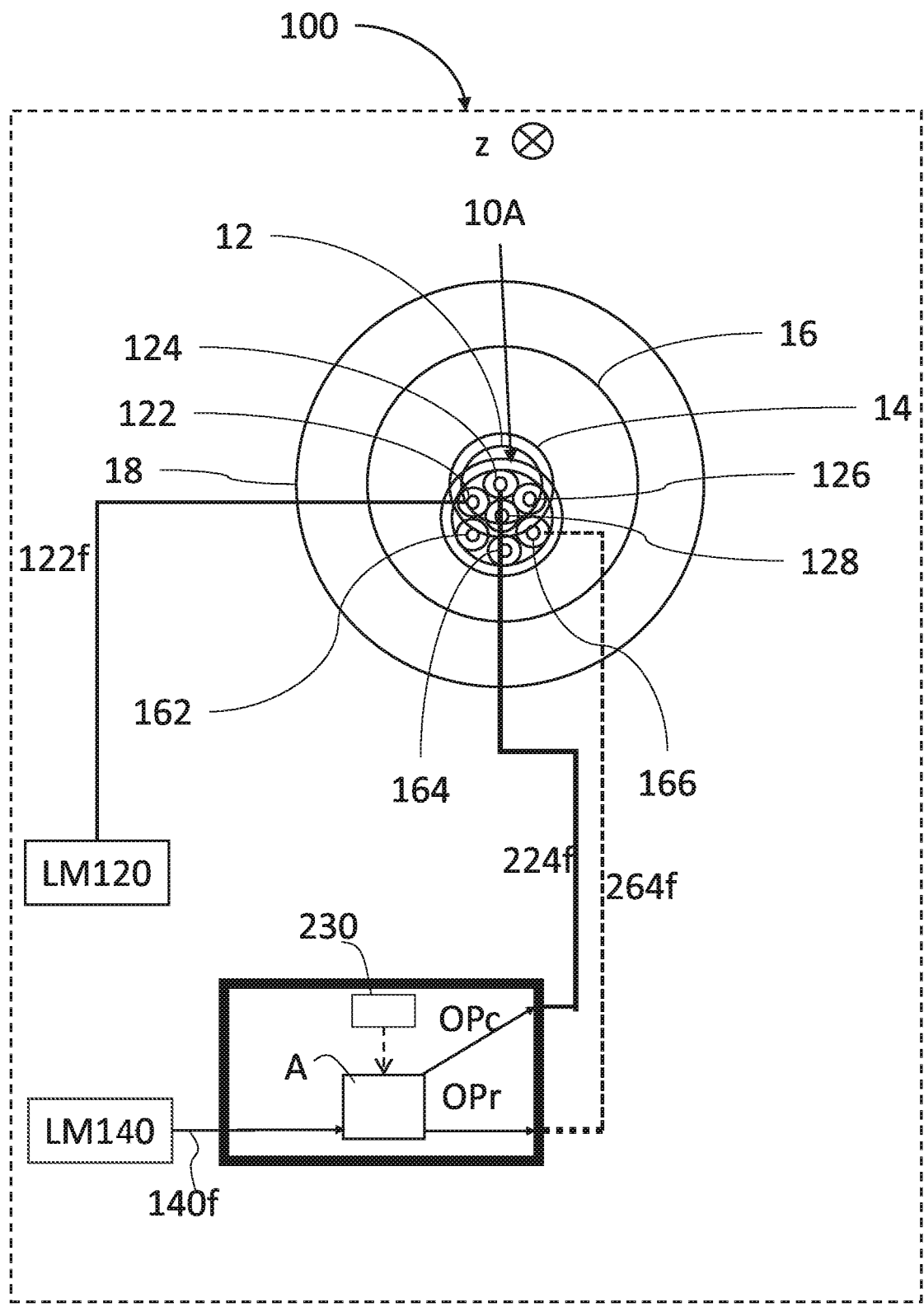
FIG. 2 is exemplary of an apparatus as per the present disclosure.

FIG. 2 is exemplary of an apparatus 100 to generate a laser beam with variable optical parameters. The laser beam is coupled to an input interface 10A at one end (for example, the one visible in the figure) of the double-clad fiber 10 and emitted at an output interface at an opposite end (not visible in the figure) of the fiber 10. Such apparatus 100 comprises:
- the double-clad fiber 10;
- a first laser module LM120 and a second laser module LM140, each comprising at least one laser source, for example a fiber or diode laser source, whose laser is configured for being guided via respective portions of optical fiber 120f, 140f, and respective control modules for controlling said respective laser sources (for example, for switching the sources on or off);
- an optical-switching module or optical switch 200 comprising an input port 210 and two output ports 224, 264, for example a fiber-to-free-space optical coupler, one or more adjustable optical components A, for example comprising a mirror that can be adjusted via a mechanical actuator, which define two optical paths OPc, OPr, wherein a first path OPc is defined between the input node 210 and an input channel, for example the channel indicated as 124, of the first set of input channels 122, 124, 126, 128, via the first output node 224, whereas the second path OPr is defined between the input node 210 and an input channel, for example the channel indicated as 164, of the second set of input channels 162, 164,

166, via the second output node 264; the optical switch 200 can be controlled for switching between the first optical path OPc and the second optical path OPr; in particular, in the example illustrated, the optical switch 200 comprises a logic unit 230 to drive such adjustable optical components, optionally under the control of an external control module; the first and second optical paths OPc, OPr may comprise respective first portions in free space and respective second portions where the radiation is guided via respective portions of optical fiber, for example by the portions of optical fiber 224f, 264f; and a coupling interface, that is the interface 10A (referred to, for brevity, as coupler), for coupling to the double-clad fiber 10, which comprises a first set of input channels 122, 124, 126, 128 of the first core 12 and a second set of input channels 162, 164, 166 of the second clad 16.

It is noted that, even though in the example of FIG. 2 four input channels are represented for the first set of input channels 122, 124, 126, 128 and three input channels are represented for the second set of input channels 162, 164, 166, these numbers are provided purely by way of non-limiting example, being otherwise understood that any number of input channels may be present both for the first set of channels and for the second set of channels, within the limits of available room.

The input channels 122, 124, 126, 128 and 162, 164, 166 can extend along the longitudinal axis of the section of multi-clad fiber 10 in the coupler 10A, the set of input channels 122, 124, 126, 128 and 162, 164, 166 having the function of housing, that is coupling optical fibers.

As represented in FIG. 2, for example:

the first laser module LM120 of the apparatus 100 is coupled to one end of a respective optical fiber 122f, whereas the opposite end of the aforesaid respective optical fiber 122f is coupled to one of the input channels of the first set of input channels 122, 124, 126, 128, for example to the input channel 122;

the second laser module LM140 of the apparatus 100 is coupled to one end of a respective optical fiber 140f, whereas the opposite end of the aforesaid respective optical fiber 140f is coupled to the input node 210 of the optical switch 200;

the first output node 224 is coupled to one end of a respective optical fiber 224f, whereas the opposite end of the aforesaid respective optical fiber 224f is coupled to one of the input channels of the first set of input channels 122, 124, 126, 128 of the core 12 of the double-clad fiber 10, for example the input channel designated by 124; and the second output node 264 is coupled to one end of a respective optical fiber 264f, whereas the opposite end of the aforesaid respective optical fiber 264f is coupled to one of the input channels of the second set of input channels 162, 164, 166 of the second cladding layer 16 of the double-clad fiber 10, for example the input channel designated by 164.

The dual-clad fiber 10 is configured a laser beam to provide at the output end that propagates in the fiber, in particular propagating starting from at least one between the first laser module LM120 and the second laser module LM140, that is when at least one of the two is in a power-on state, that is switched on, as discussed in the following.

In one embodiment, further laser modules may be coupled to further input channels, for example, one for each of the channels 126, 128 of the core, so that a high-power laser beam can be supplied at output once the modules are in a respective power-on state.

Figure 3:
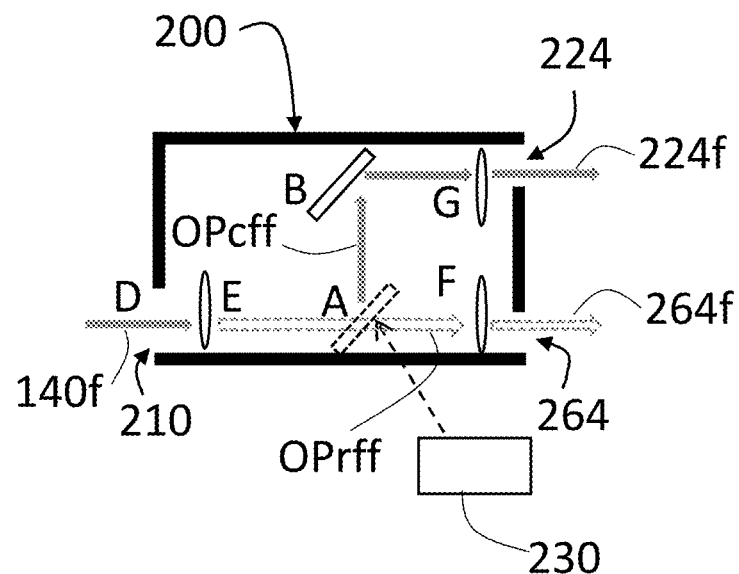
FIG. 3 represents details of FIG. 1.

FIG. 3 exemplifies an implementation of the optical switch 200, wherein, in particular, respective portions in free space OPcff, OPrff of the respective first and second optical paths that can be selected via the optical switch are visible.

For instance, the optical switch 200 comprises:

a first collimating lens E;

a first movable reflecting surface A, for example an orientable mirror Am;

a second reflecting surface, for example an oriented mirror B; and a first focusing lens G and a second focusing lens F.

The free-space portion of the first optical path OPcff that goes from the input port 210 to the first output port 224 comprises:

the first focusing lens E;

the adjustable mirror A oriented at 45° with respect to the direction of propagation of the beam coming from the lens E;

the oriented mirror B parallel to the adjustable mirror A with the reflecting surfaces that reflect towards one another; and the first focusing lens G.

The free-space portion of the second optical path OPrff comprises:

the input coupler 210;

the first collimating lens E; and the second focusing lens F, with the adjustable mirror A set parallel to the direction of propagation of the beam coming from the lens E so as not to intercept it.

In this way, the electromagnetic radiation emitted by the fiber 140f of the second laser module LM140 follows the following optical paths:

a) a first optical path OPcff: it is directed towards the lens E, then reaches the lens F, and then reaches the input channel 164 of the cladding layer 16; and b) a second optical path OPrff: if the mirror A is located on the optical path described in point a), then the electromagnetic radiation is reflected towards the mirror B and then reflected towards the focusing lens G and towards the input channel 124 of the core 12.

This solution facilitates to have a power that can be scaled between the core and the cladding, and moreover to inject all the power into the core so as to have a quasi-Gaussian mode, an annular mode, or a combination of the two.

The optical properties of the above laser beam supplied by the double-clad fiber 10 may be varied. In particular, it is possible to obtain at least three output laser beam wave-front profiles, as exemplified in FIG. 4 where three profiles $L_G$, $L_R$, $L_M$ are represented as plot of the traverse laser intensity (i.e., for example, a power expressed in watts) as a function the radius R of the fiber, where the center of the profile corresponds to the center of the fiber.

In a variant embodiment, one or more of the first optical path OPc and the second optical path OPr may be entirely obtained with optical fiber, i.e., also the respective portions here described as "portions in free space" OPcff, OPrff may comprise one or more parts made of optical fiber or be entirely made of optical fiber. In other words, in this variant embodiment, the apparatus described herein comprises an optical-fiber switch, without any free-space portions, and the apparatus may hence be defined as full-glass apparatus, that is completely made of optical fiber.

There now follows a description of a method for generating a laser beam with selection of the wave-front profile in an apparatus 100 for combining laser beams in optical fibers.

In general, a method for varying the parameters of a laser beam emitted by one end of a multi-clad fiber, in particular for selecting the wave-front profile, in an apparatus 100, such as the one described with reference to FIG. 2, comprises operations of:
- selecting a power-on state of each of the laser modules LM120, L140; and
- selecting, via the switch 200, either the first optical path or the second optical path to be coupled to the second module.

Figure 4:
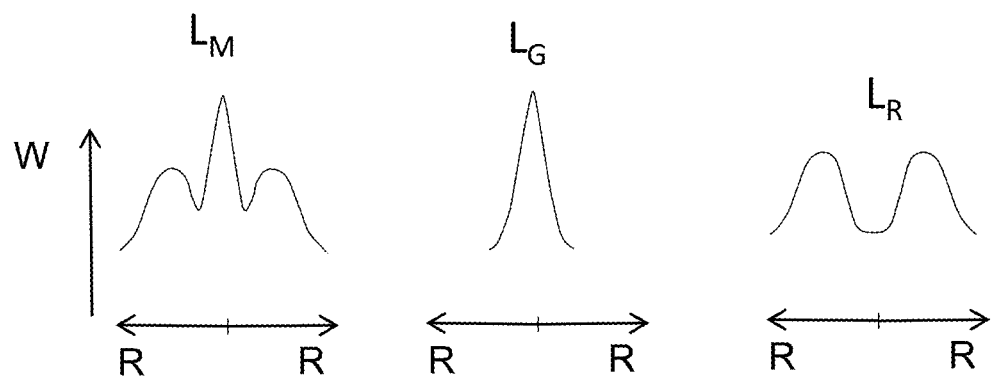
FIG. 4 represents diagrams of laser profiles as per the present disclosure.

With reference to FIG. 4, for example, a profile of a quasi-Gaussian type $L_G$, which can be associated to 75% of the power can be obtained via:
- switching on the first module LM120; and/or
- selecting the first optical path OPc in the switch 200 and switching on the second module LM140.

Once again with reference to FIG. 4, for example, a profile of an annular type $L_R$ that can be associated to 25% of the power can be obtained via selecting the second optical path OPr in the switch 200 and by switching on the second module LM140, possibly switching off the module LM120.

For instance, a profile of a mixed type $L_M$, which can be associated to 100% of the power, can be obtained via:
- switching on the first module LM120; and
- selecting the second optical path OPr in the switch 200, and switching on the second module LM140.

Then, multiple intermediate combinations can be obtained via selecting a percentage of the maximum power of the first module LM120 and of the second module LM140.

In a variant embodiment, a certain number of modules can be connected to the fibers 122 of the core 12, whereas a certain number of modules can be connected to the fibers 164 of the cladding layer 16 with the aid of one or more optical switches.

Hence, from the discussion in the foregoing, advantages of the solution emerge clearly presented.

The apparatus and method described facilitate, as compared to the solutions that envisage directing the output of some of the laser modules that usually constitute a high-power fiber laser into the core or into the cladding, not to abandon the possibility to use of all the power that can be emitted by the laser when it is desired to use a beam only at low BPP (propagation in the core) or else only at high BPP (propagation in the cladding) typical of the second method.

The apparatus and method discussed herein, in this regard, present the advantages of the coupling solutions via optical devices of the power in the core of in the cladding of the fiber, without envisaging only to direct the total available laser power alternatively in the core or in the cladding.

The apparatus and method described make it easier to obtain improved functions, for example a power that can be scaled between two or more concentric areas of a multi-clad fiber.

The apparatus and method described enable to facilitate easier distribution of the power of one or more laser beams in a first core of a multi-clad fiber.

The apparatus and method described enable to facilitate obtaining a laser profile of a quasi-Gaussian type, an annular type, or a mixture of the two, for example enabling passage from one profile to the other in a flexible way.

The apparatus and method described make it possible to obtain more easily a distribution of part of the power in the core and part of the power in the cladding.

One or more embodiments afford both the advantages of the coupling solutions using optical devices and the flexibility in distribution of the power in the core or in the cladding of a delivery fiber of lasers, facilitating the possibility of directing the output of part of the laser modules that usually constitute a high-power laser into the core or into the cladding without the limitations of either of the two solutions. An advantage of one or more embodiments is the possibility of using the totality of the power that can be emitted by the laser at low BPP, for example even in the absence of a step of "switching" of all of the high power provided by the laser.

Without prejudice to the underlying principles, the details and the embodiments may vary, even appreciably, with respect to what has been described, purely by way of example, without thereby departing from the scope of protection. The scope of protection is defined by the annexed claims.

One or more embodiments may manage the power of the individual module, for example by means of a switch, so as to solve the problem of managing all the power directly in the fiber itself.

The invention claimed is:

1. An apparatus, comprising:
    a multi-clad fiber comprising
    a light-guiding core surrounded by at least a further cladding layer around said guiding core,
    an input interface comprising a first set of input channels in said light-guiding core configured to receive at least a first optical fiber and a second set of input channels in said at least cladding layer configured to receive at least a second optical fiber,
    an optical switch module comprising:
    i) an input port,
    ii) a first and a second output port,
    iii) a first optical path between said input port and said first input channel in said first set of input channels in said core via said first output port, and
    iv) at least a second optical path between said input port and a second input channel in said second set of input channels in said at least one guiding cladding layer via said second output port,
    said optical switch module being controllable to switch between said first optical path and said second optical path,
    a set of laser modules comprising at least a first laser module and at least a second laser module, said laser modules being configured to emit respective laser beams when in a respective power-on state,
    said at least first laser module being coupled to an input channel in said first set of input channels via said at least first optical fiber,
    said at least second laser module being coupled to said optical switch module.

2. The apparatus of claim 1, wherein:
    said first optical path comprises at least an optical fiber portion and said second optical path comprises at least an optical fiber portion,
        said first and second optical path in said optical switch module are alternatively selectable controlling an adjustable optical component in said optical switch module.

3. The apparatus of claim 1, wherein said at least second laser module is coupled to said optical switch module via a fourth optical fiber.

4. The apparatus of claim 1, wherein the apparatus comprises a plurality of laser modules coupled to respective input channels in a plurality of input channels in said first set of input channels in said core in said multi-clad fiber.

5. The apparatus of claim 1, wherein:
said selectable first optical path intercepts said adjustable optical element oriented in a first position,
said second optical path does not intercepts said adjustable optical element oriented in a second position.

6. The apparatus of claim 1, wherein said set of optical components further comprises:
a) a first collimating lens,
b) said adjustable element comprises a mirror adjustable between said first position and said second position,
c) a mirror,
d) a first focusing lens,
e) a second focusing lens,
wherein:
said first optical path is defined between said input port, said first collimating lens, said adjustable mirror oriented in said first position, said mirror, said first focusing lens and said first output port, and
said second optical path is defined between said input port, said first collimating lens, said adjustable mirror oriented in said second position, said second focusing lens and said second output port.

7. The apparatus of claim 1, wherein the apparatus comprises a confining cladding layer around the core, whose refraction index ($n_2$) is lower than a refraction index ($n_1$) of said core, and said cladding layer whose refraction index ($n_3$) is higher than the refraction index (n2) of said confining cladding layer, which is interposed between said core and said cladding layer.

8. The apparatus of claim 1, wherein said multi-clad fiber comprises at least a third cladding layer.

9. The apparatus of claim 1, wherein said multi-clad fiber comprises a sequence of cladding layers around the core with respective progressively decreasing refractive indexes.

10. The apparatus of claim 6, wherein said adjustable mirror comprises an actuator and a control mode of said actuator.

11. A method for generating a laser beam with wavefront profile selection in an apparatus according to claim 1, wherein said wavefront profile selection comprises:
selecting a respective power-on state of respective said at least first laser module and said at least second laser module in said set of laser modules,
selecting alternatively one of said first and second optical path in said optical switch module.

12. The method of claim 11, comprising:
selecting said first optical path in said optical switch module,
selecting said power-on state of said at least first laser module in said set of laser modules.

13. The method of claim 11, comprising:
selecting said second optical path in said optical switch module, and
selecting said power-on state of said at least a second laser module in said set of laser modules.

14. The method of claim 12, further comprising selecting said power-on state of said at least a second laser module in said set of laser modules.

* * * * *